(12) United States Patent
Woyciesjes et al.

(10) Patent No.: US 7,854,253 B2
(45) Date of Patent: Dec. 21, 2010

(54) CORROSION INHIBITORS, CORROSION INHIBITING HEAT TRANSFER FLUIDS, AND THE USE THEREOF

(75) Inventors: Peter M Woyciesjes, Woodbury, CT (US); Aleksei V Gershun, Southbury, CT (US); Filipe J Marinho, Danbury, CT (US); Thomas G Kalagher, Terryville, CT (US); Bo Yang, Ridgefield, CT (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 12/642,104

(22) Filed: Dec. 18, 2009

(65) Prior Publication Data

US 2010/0098987 A1   Apr. 22, 2010

Related U.S. Application Data

(62) Division of application No. 11/222,024, filed on Sep. 8, 2005, now Pat. No. 7,662,304.

(60) Provisional application No. 60/607,898, filed on Sep. 8, 2004.

(51) Int. Cl.
*F28D 15/00* (2006.01)
*F28F 13/06* (2006.01)
*C09K 5/10* (2006.01)
*C09K 5/08* (2006.01)
*C09K 5/14* (2006.01)

(52) U.S. Cl. .................. 165/104.19; 165/108; 165/177; 252/78.3; 252/71; 252/73; 252/77; 252/78.1; 429/26

(58) Field of Classification Search ............ 165/104.19, 165/108, 177; 252/71, 73, 77, 78.1, 78.3; 429/26
See application file for complete search history.

(56) References Cited

U.S. PATENT DOCUMENTS 3,121,692 A * 2/1964 Morehouse et al. ........... 252/75

(Continued)

FOREIGN PATENT DOCUMENTS

CA   2344856   3/2000

(Continued)

OTHER PUBLICATIONS

"Amberlyst Weak Base Anions", Internet Article, URL: http://web.archive.org/web/20040623050423/http://www.rohmhaas.com/ionexchange/IP/wba.htm, Jun. 23, 2004.

(Continued)

*Primary Examiner*—Joseph D Anthony
(74) *Attorney, Agent, or Firm*—Cantor Colburn LLP

(57) ABSTRACT

Disclosed is a corrosion inhibitor for use in heat transfer fluids having a conductivity of less than 200 μS/cm, the corrosion inhibitor having an azole compound, and at least one of a siloxane based surfactant, colloidal silica, or a mixture thereof. Also disclosed is a corrosion inhibiting heat transfer fluid, the heat transfer fluid having a conductivity of no more than or equal to 200 μS/cm and comprising the disclosed corrosion inhibitor. Also provided is an assembly comprising an alternative power source and a heat transfer system in thermal communication with the alternative power source, the heat transfer system comprising the disclosed corrosion inhibiting heat transfer fluid. In addition, a method of making a corrosion inhibiting heat transfer fluid is disclosed wherein the disclosed corrosion inhibitor is added to heat transfer fluid having a conductivity of less than 200 μS/cm.

17 Claims, 1 Drawing Sheet

U.S. PATENT DOCUMENTS

| | | | |
|---|---|---|---|
| 3,216,948 | A | 11/1965 | Redding |
| 3,312,622 | A | 4/1967 | Pines et al. |
| 3,507,702 | A | 4/1970 | Sanderson |
| 3,960,740 | A | 6/1976 | Truett |
| 3,964,930 | A | 6/1976 | Reiser |
| 4,284,729 | A | 8/1981 | Cross et al. |
| 4,402,847 | A * | 9/1983 | Wilson et al. .................. 252/75 |
| 4,485,025 | A * | 11/1984 | Darden ......................... 252/75 |
| 4,514,427 | A | 4/1985 | Mitchell et al. |
| 4,584,125 | A | 4/1986 | Griswold et al. |
| 4,588,513 | A * | 5/1986 | Triebel et al. .................. 252/75 |
| 4,648,883 | A | 3/1987 | Podder |
| 5,200,278 | A | 4/1993 | Watkins et al. |
| 5,723,060 | A | 3/1998 | Bruhnke et al. |
| 5,725,794 | A | 3/1998 | Bruhnke et al. |
| 5,776,624 | A | 7/1998 | Neutzler |
| 5,804,063 | A * | 9/1998 | Creeron et al. ......... 210/167.01 |
| 6,203,719 | B1 * | 3/2001 | Turcotte et al. ................ 252/76 |
| 6,228,283 | B1 * | 5/2001 | Turcotte et al. ................ 252/76 |
| 6,486,248 | B2 | 11/2002 | Ashley et al. |
| 6,528,564 | B1 | 3/2003 | Xia |
| 6,605,126 | B1 | 8/2003 | Xia et al. |
| 6,663,993 | B2 | 12/2003 | Imaseki et al. |
| 6,673,482 | B2 | 1/2004 | Imazeki et al. |
| 6,709,779 | B2 | 3/2004 | Uozumi |
| 6,887,597 | B1 * | 5/2005 | Yang et al. .................... 429/12 |
| 7,371,334 | B2 | 5/2008 | Wenderoth et al. |
| 7,419,617 | B2 | 9/2008 | Wenderoth et al. |
| 7,419,618 | B2 | 9/2008 | Wenderoth et al. |
| 7,481,948 | B2 * | 1/2009 | Jeffcoate et al. ............... 252/71 |
| 2001/0050191 | A1 | 12/2001 | Ogawa et al. |
| 2002/0031693 | A1 | 3/2002 | Ishikawa |
| 2002/0063088 | A1 | 5/2002 | Hidaka et al. |
| 2002/0076591 | A1 | 6/2002 | Imaseki et al. |
| 2003/0072981 | A1 | 4/2003 | Imaseki et al. |
| 2003/0198847 | A1 * | 10/2003 | Jeffcoate et al. ............... 429/26 |
| 2004/0001984 | A1 | 1/2004 | Alva |
| 2004/0028963 | A1 | 2/2004 | Kormann et al. |
| 2004/0028971 | A1 | 2/2004 | Wenderoth et al. |
| 2004/0086757 | A1 | 5/2004 | Mohapatra |
| 2004/0110050 | A1 | 6/2004 | Elhamid et al. |
| 2004/0129920 | A1 | 7/2004 | Wenderoth et al. |
| 2005/0269548 | A1 * | 12/2005 | Jeffcoate et al. ............... 252/71 |
| 2006/0049167 | A1 * | 3/2006 | Yang et al. .................... 219/388 |
| 2006/0051639 | A1 * | 3/2006 | Yang et al. .................... 429/26 |
| 2006/0054564 | A1 | 3/2006 | Woyciesjes et al. |
| 2006/0063050 | A1 * | 3/2006 | Yang et al. .................... 429/26 |
| 2007/0075120 | A1 * | 4/2007 | Yang et al. .................... 228/101 |
| 2009/0266519 | A1 * | 10/2009 | Marinho et al. ........ 165/104.19 |
| 2009/0294102 | A1 * | 12/2009 | Yang et al. ............. 165/104.19 |

FOREIGN PATENT DOCUMENTS

| | | |
|---|---|---|
| CA | 2430443 | 7/2002 |
| CA | 2435593 | 8/2002 |
| CA | 2445792 | 11/2002 |
| CA | 2449208 | 12/2002 |
| EP | 0376126 | 7/1990 |
| EP | 1262535 | 12/2002 |
| EP | 1323677 | 2/2003 |
| EP | 1304367 | 4/2003 |
| EP | 1416563 | 5/2004 |
| EP | 1457542 | 9/2004 |
| HU | 209546 | 7/1994 |
| JP | 8185877 | 7/1996 |
| WO | WO0017951 | 3/2000 |
| WO | WO0175999 | 10/2001 |
| WO | WO02055630 | 7/2002 |
| WO | WO02055759 | 7/2002 |
| WO | WO02090462 | 11/2002 |
| WO | WO02101848 A2 | 12/2002 |
| WO | WO02101848 A3 | 12/2002 |
| WO | WO03033616 | 4/2003 |
| WO | WO03061044 A2 | 7/2003 |
| WO | WO03061044 A3 | 7/2003 |
| WO | WO03070854 | 8/2003 |
| WO | WO2004053015 | 6/2004 |

OTHER PUBLICATIONS

"Physical Sciences Information Gateway—Chemical Data Tablesy", Internet Article, URL: http://web.archive.org/web/20040305150910/http://www.psigate.ac.uk/newsite/reference/chemdata/12.html, Mar. 5, 2004.

Dr F.T. Lange, et al., Emerging Contaminants for Drinking Water Supplies, Perfluoroalkylcarboxylates and -sulfonates, Jun. 2006, www.riwa.org/e)_publikaties/137_ptfe_report.PDF, 29 pages.

Educ. Reso for Part. Techn. 032Q-Nelson, Dispersing Powders in Liquids, Part 3, Copyright 2003 Ralph Nelson, Licensed to ERPT, pp. 4:1-12.

International Search Report for International Application No. PCT/US2005/031778, mailed Dec. 29, 2005.

International Search Report for International Application No. PCT/US2005/031834, mailed Jan. 22, 2007.

International Search Report for International Application No. PCT/US2005/032173, mailed Dec. 28, 2005.

International Search Report for International Application No. PCT/US2005/032174, mailed Jul. 17, 2006, 3 pages.

Written Opinion for International Search Report for International Application No. PCT/US2005/031778, mailed Dec. 19, 2005, 9 pages.

Written Opinion for International Search Report for International Application No. PCT/US2005/031834, mailed Jan. 22, 2007.

Written Opinion for International Search Report for International Application No. PCT/US2005/032173, mailed Dec. 28, 2005, 5 pages.

Written Opinion for International Search Report for International Application No. PCT/US2005/032174, mailed Jul. 17, 2006, 16 pages.

* cited by examiner

CORROSION INHIBITORS, CORROSION INHIBITING HEAT TRANSFER FLUIDS, AND THE USE THEREOF

This application is a Division of U.S. application Ser. No. 11/222,024 filed Sep. 8, 2005 now U.S. Pat. No. 7,662,304, which claims priority to U.S. Provisional Application Ser. No. 60/607,898, filed Sep. 8, 2004. U.S. application Ser. No. 11/222,024 is incorporated by reference herein in its entirety.

FIELD OF THE INVENTION

The invention relates to corrosion inhibitors, corrosion inhibiting heat transfer fluids having low conductivity and more particularly to corrosion inhibiting heat transfer fluids for use in applications and articles comprising a power source in thermal communication with a heat transfer system.

BACKGROUND OF THE INVENTION

Heat transfer systems in thermal communication with a power source have been utilized to regulate heat generated during the operation of the power source. For example, automotive vehicles have employed coolants and cooling systems that transfer and dissipate heat generated as a by-product of gasoline powered internal combustion engines. In this case, the coolants and cooling systems ensure that the engine operates in an optimum environment and is not subject to undesirably high temperatures.

However, alternatives to traditional gasoline powered internal combustion engine are now desired, especially alternatives that address public concerns regarding the environmental and the management of natural resources. As a result, new power source technologies continue to be developed, especially those that provide improvements in energy efficiency. Examples of alternative power sources that have been developed include, but are not limited to, batteries, fuel cells, solar or photovoltaic cell, and internal combustion engines powered by the condensation of steam, natural gas, diesel, hydrogen, and/or the like. Such alternative power sources may be used alone or in combinations thereof, such as those employed in hybrid vehicles.

Although such alternative power sources often provide improvements in energy efficiency as compared to gasoline powered internal combustion engines, they continue to require the use of heat transfer systems and heat transfer fluids. In particular, heat transfer systems and fluids are necessary to maintain optimum operating conditions, particularly in regards to temperature.

Unfortunately, however, traditional prior art cooling systems and coolants are unsuitable (or not optimized) for use with alternative power sources, especially those employing electricity or an electrical charge. For example, traditional prior art coolants are typically characterized by extremely high conductivities, often in the range of 3000 µS/cm or more. The use of highly conductive heat transfer fluids with electricity based alternative power sources can result in electrical shock, increased corrosion and/or the short-circuiting of electrical current.

As a result, conventional heat transfer fluids are unsuitable for use with alternative power sources; especially electricity based alternative power sources.

Fuel cells are a particularly attractive alternative power source because of their clean and efficient operation. Fuel cells have been proposed for use in numerous applications.

For example, it has been proposed that fuel cells replace the internal combustion engines currently used in automobiles.

Several different kinds of fuel cells are currently under development and appear to hold promise for use in automotive applications. Illustrative examples include Proton Exchange Membrane or Polymer Electrolyte Membrane (PEM) fuel cells, phosphoric acid (PA) fuel cells, molten carbonate (MC) fuel cells, solid oxide (SO) fuel cells, and alkaline fuel cells.

A fuel cell assembly typically comprises an anode, a cathode, and an electrolyte in between the two electrodes. Normally, an oxidation reaction (e.g., $H_2 \rightarrow 2H^+ + 2e$) takes place at the anode and a reduction reaction (e.g., $O_2 + 2H_2O + 4e \rightarrow 4OH^-$) takes place at the cathode. The electrochemical reactions that occur at the electrodes are exothermic, i.e., they produce heat.

The successful replacement of internal combustion engines with fuel cells requires that optimal operating conditions be achieved and maintained, i.e., a fuel cell must achieve the desirable current density level without degradation of fuel cell components. It is therefore necessary to control the exothermic heat produced during the electrochemical reactions.

For example, to achieve optimal operating conditions, the normal operating temperature of a PEM fuel cell assembly is controlled so that it remains within a range of from 60° C. to 95° C. Because of the exothermic nature of the electrochemical reactions, it is desirable to use a heat transfer fluid or heat transfer fluid to keep the electrode assembly at an operating temperature that is within the desired operating temperature range. However, the presence of an electrical charge makes it challenging to use fuel cells with prior art heat transfer systems and fluids.

Moreover, in order to produce sufficient power, a fuel cell based automotive engine might have many fuel cells connected together in series to form a fuel cell stack. Individual fuel cells may have an operating voltage of from 0.6 to 1.0V DC. In one instance, it is contemplated that anywhere from 100 to 600 individual fuel cells might be connected in series. As a result, the DC electrical voltage across automotive fuel cell stacks could be very high, typically ranging from 125 to 450 V DC.

These same voltages are experienced in the heat transfer fluid systems of the individual fuel cells used in automotive fuel cell stacks. To prevent or minimize electrical shock hazard, the heat transfer fluid must have very low conductivity. Low electrical conductivity for fuel cell heat transfer fluid is also desirable for the reduction of shunt current in the heat transfer fluid system and the minimization of system efficiency reduction.

There is therefore a need to provide low conductivity' heat transfer fluids intended for use in heat transfer systems that are in thermal communication with alternative power sources.

In addition to low electrical conductivity, heat transfer fluids used with alternative power sources must also have high heat capacity, low viscosity, and high thermal conductivity. Such properties help minimize pressure drops and reduce pumping power requirements while still meeting heat transfer requirements. Good surface wetting properties are also desirable in a heat transfer fluid employed with alternative power sources. A heat transfer fluid with good surface wetting characteristics is helpful in reducing pressure drops at a condition of constant flow rate.

Another important characteristic of a desirable heat transfer fluid is corrosion resistance. Many heat transfer fluid systems used with alternative power sources often have several metallic components. Illustrative metals found in heat transfer systems employed with alternative power sources include ferrous and non ferrous alloys such as stainless steel, aluminum, brass, braze alloy, and the like. However, such metals are vulnerable to corrosion as a result of contact with the heat transfer fluid.

There is therefore a need to provide corrosion inhibiting heat transfer fluids in heat transfer systems used with alternative power sources that minimize corrosion and prolong the service life of the heat transfer system. More particularly, there remains a need for low conductivity heat transfer fluids that inhibit the corrosion of heat transfer systems in thermal communication with alternative power source.

SUMMARY OF THE INVENTION

Disclosed is a corrosion inhibitor for use in heat transfer fluids having a conductivity of no more than 200 μS/cm, the corrosion inhibitor comprising an azole compound, and at least one of a siloxane based surfactant, colloidal silica, or mixture thereof.

Also disclosed is a corrosion inhibiting heat transfer fluid, the heat transfer fluid having a conductivity of no more than 200 μS/cm and comprising a corrosion inhibitor comprising an azole compound, and at least one of a siloxane based surfactant, colloidal silica, or mixtures thereof.

Also disclosed is a heat transfer system, comprising a circulation loop defining a flow path for a corrosion inhibiting heat transfer fluid having a conductivity of less than 10 μS/cm and comprising the disclosed corrosion inhibitor.

An assembly powered by an alternative power source is disclosed, the assembly comprising an alternative power source and a heat transfer system in thermal communication with the alternative power source, the heat transfer system comprising a circulation loop defining a liquid flow path, and a corrosion inhibiting heat transfer fluid in thermal communication with the alternative power source, the corrosion inhibiting heat transfer fluid having a conductivity of less than 10 μS/cm and comprising a corrosion inhibitor comprising an azole compound, and at least one of a siloxane based surfactant, colloidal silica, or mixtures thereof. In one exemplary embodiment, the alternative power source comprises a fuel cell comprising an electrode assembly comprising an anode, a cathode, and an electrolyte.

Finally, a method of making a corrosion inhibiting heat transfer fluid is disclosed, the method comprising adding a corrosion inhibitor to a heat transfer fluid having a conductivity of less than 200 μS/cm, the corrosion inhibitor comprising an azole compound, and at least one of a siloxane based surfactant, colloidal silica, or mixtures thereof.

DETAILED DESCRIPTION OF A PREFERRED EMBODIMENT

Figure 1:
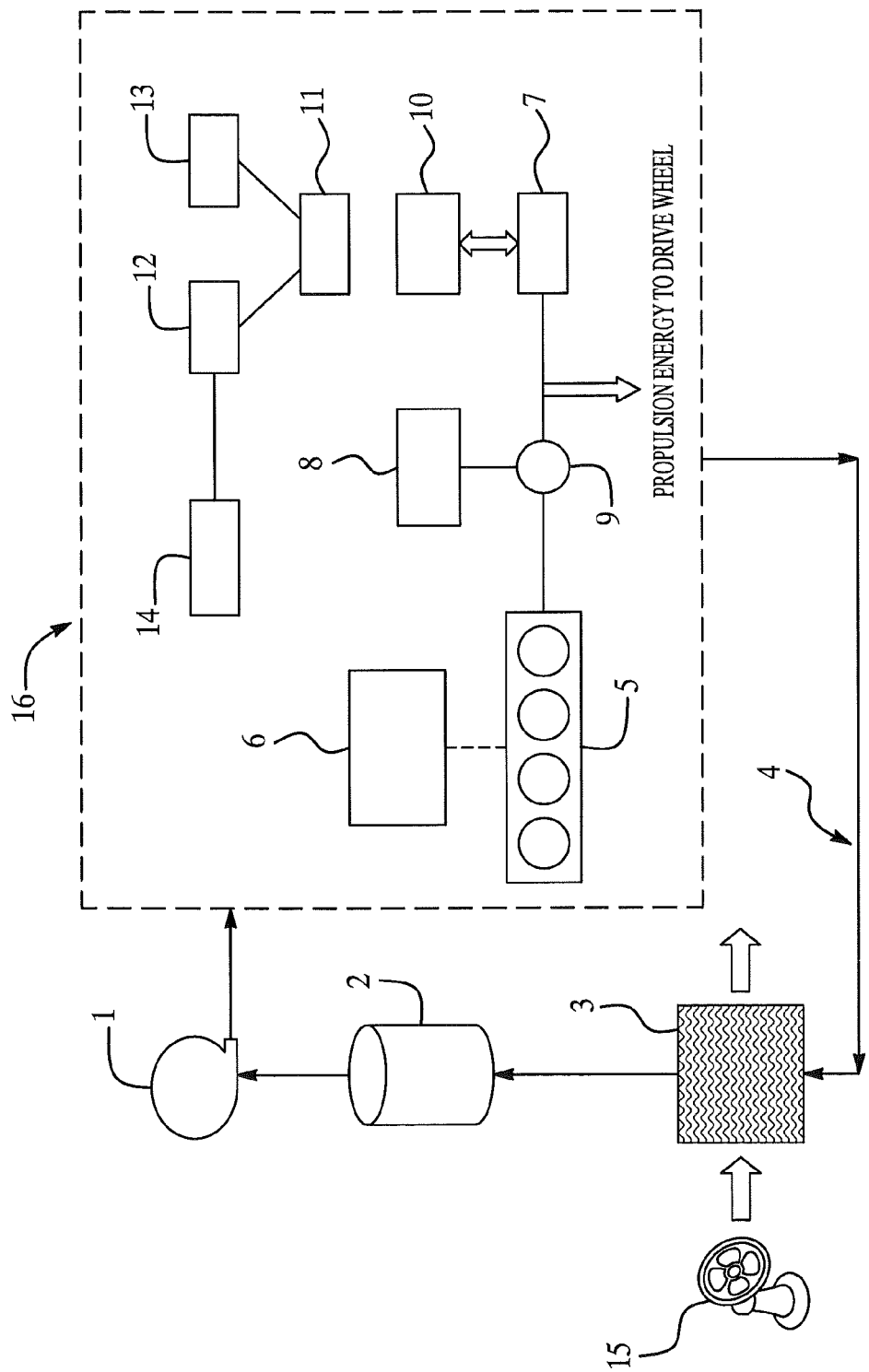
FIG. 1 is a schematic diagram of an illustrative assembly comprising an alternative power source and a heat transfer system, more particularly a hybrid vehicle cooling system.

The disclosed corrosion inhibiting heat transfer fluids for use in assemblies comprising alternative power sources, especially fuel cells, may be characterized as having very low conductivity.

The term 'heat transfer fluid' as used herein refers to a fluid or liquid that is capable of transferring and/or dissipating a quantity of thermal energy from a first point to second point. In one embodiment, the disclosed heat transfer fluids may be referred to as coolants. In another embodiment, the disclosed heat transfer fluids may also be referred to as antifreeze, due to the ability of some heat transfer fluids to function as freezing point depressants.

The term 'low conductivity' as used herein generally refers to electrical conductivities of no more than 200 μS/cm. In one embodiment, the disclosed corrosion inhibiting heat transfer fluids will have a conductivity of less than 150 μS/cm, while in another embodiment, the disclosed corrosion inhibiting heat transfer fluids will have a conductivity of less than 50 μS/cm.

In other embodiments, the disclosed corrosion inhibiting heat transfer fluids will have an electrical conductivity of from 0.02 μS/cm to no more than 200 μS/cm. In one embodiment, the disclosed corrosion inhibiting heat transfer fluids for use in fuel cells will have a conductivity of from 0.2 μS/cm to 100 μS/cm. In another embodiment, the disclosed corrosion inhibiting heat transfer fluids will have a conductivity of from 0.05 to less than 50 μS/cm, while in one exemplary embodiment, the disclosed corrosion inhibiting heat transfer fluids will have a conductivity of from 0.05 to no more than 25 μS/cm. In an especially exemplary embodiment, the disclosed corrosion inhibiting heat transfer fluids will have an electrical conductivity of from 0.05 to no more than 10 μS/cm. In one especially exemplary embodiment, the disclosed corrosion inhibiting heat transfer fluids will have an electrical conductivity of from 0.05 to no more than 50 μS/cm.

The electrical conductivity of the disclosed corrosion inhibiting heat transfer fluids may be measured by using the test methods described in ASTM D1125, i.e., "Standard Test Methods for Electrical Conductivity and Resistivity of Water" or an equivalent method.

A 'corrosion inhibiting heat transfer fluid' as used herein refers to a heat transfer fluid having a sufficient amount of one or more corrosion inhibitors such that metallic components immersed in said fluid have a reduced rate of corrosion relative to their corrosion in a heat transfer fluid that is identical in all respects except that it lacks any corrosion inhibitors.

In one embodiment, the disclosed corrosion inhibiting heat transfer fluids will comprise a corrosion inhibitor comprising an azole compound and at least one of a siloxane based surfactant, colloidal silica, or combinations thereof. In another embodiment, the disclosed corrosion inhibiting heat transfer fluids will comprise at least one alcohol in addition to the required corrosion inhibitor. In one exemplary embodiment, the disclosed corrosion inhibiting heat transfer fluids will comprise the required corrosion inhibitor, at least one alcohol, and water. In another exemplary embodiment, the disclosed corrosion inhibiting heat transfer fluids will comprise the required corrosion inhibitor, water, at least one alcohol, and optionally one or more of a colorant, a wetting agent, an antifoam agent, a biocide, a defoamer, a bitterant, a nonionic dispersant or combinations thereof.

'Heat transfer fluid' as used herein refers to both concentrated solutions of the corrosion inhibitor and alcohol or water/alcohol mixtures as well as to diluted solutions of the same mixed with water, preferably deionized water. It will be appreciated that although heat transfer fluid may be purchased, transported or used in concentrated solutions consisting mainly of one or more alcohols and corrosion inhibitor, such concentrates will often be diluted with water, especially deionized water, prior to incorporation or use in a fuel cell. Dilution ratios of from 1:4 to 4:1 (DI water:Heat transfer fluid) are typical, with ratios of from 40%:60% to 60%:40% being used in one exemplary embodiment. Thus, the term 'heat transfer fluid' as used herein refers to both concentrated solutions and dilute solutions of the disclosed heat transfer fluids.

Suitable azole compounds are five-membered heterocyclic compounds having 1 to 4 nitrogen atoms. Illustrative examples include imidazoles, triazoles, thiazoles and tetrazoles of the formulas (I), (II), (III) and (IV) below, such as benzotriazole, tolytriazole, alkyl benzotriazoles, such as 4-methyl benzotriazole, 5-methyl benzotriazole, and butyl benzotriazole and the like, benzimidazole, halobenzotriazoles, such as chloro-methylbenzotriazole, tetrazole, substituted tetrazoles, thiazoles, such as 2-mercaptobenzothiazole, and the like.

In one embodiment, the azole compound will be of the formula (I), (II) (III) or (IV):

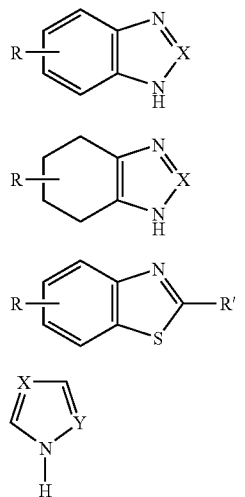

wherein R is hydrogen or halogen such as Cl or Br, or a $C_1$ to $C_{20}$ alkyl group; R' is at least one of hydrogen, $C_1$ to $C_{20}$ alkyl group, or SH or SR group; and X is N, C—SH or CH; and Y is selected from N, C—R or CH group, and R is defined as above. In one exemplary embodiment, the azole compound will be of formula (I) wherein X is N. In one particularly exemplary embodiment, the azole compound will be of formula (I) wherein X is N and R is hydrogen or an alkyl group of from 1 to less than 10 carbons.

As used herein, the term "alkyl" includes both branched and straight chain saturated aliphatic hydrocarbon groups, having the specified number of carbon atoms. The term $C_1$-$C_7$ alkyl as used herein indicates an alkyl group having from 1 to about 7 carbon atoms. When $C_0$-$C_n$ alkyl is used herein in conjunction with another group, for example, heterocycloalkyl($C_0$-$C_2$ alkyl), the indicated group, in this case heterocycloalkyl, is either directly bound by a single covalent bond ($C_0$), or attached by an alkyl chain having the specified number of carbon atoms, in this case from 1 to about 2 carbon atoms. Examples of alkyl include, but are not limited to, methyl, ethyl, n-propyl, isopropyl, n-butyl, 3-methylbutyl, t-butyl, n-pentyl, and sec-pentyl.

Illustrative examples of suitable azole compounds include benzotriazole, tolytriazole, methyl benzotriazole, i.e., 4-methyl benzotriazole and 5-methyl benzotriazole, butyl benzotriazole, mercaptobenzothiazole, benzimidazole, halo-benzotriazoles, such as chloro-methylbenzotriazoles, and the like. In one embodiment, the azole compound will be one of benzotriazole, tolytriazole, or mercaptobenzothiazole, while in one exemplary embodiment; the azole compound will be benzotriazole.

In one embodiment, the azole compound may be present in the corrosion inhibiting heat transfer fluid in an amount of from 1 ppm to about 5000 ppm, while in one exemplary embodiment; the azole compound will be present in an amount of from 10 ppm to about 500 ppm, based on the total weight of the heat transfer fluid.

In addition to the azole compound, the disclosed corrosion inhibitor for low conductivity heat transfer fluids requires at least one of a siloxane based surfactant, colloidal silica or a mixture thereof.

Siloxane based surfactants as used herein generally refers to polysiloxanes and organosilane compounds comprising at least one silicon-carbon bond.

In one embodiment, suitable polysiloxanes are generally those polysiloxanes believed to be of the general formula $R''_3$—Si—[O—Si(R'')$_2$]$_x$—OsiR''$_3$ wherein R'' is an alkyl group or polyalkylene oxide copolymer of from 1 to 200 carbons and x can be from 0 to 100. In one exemplary embodiment, suitable polysiloxanes will have at least one R'' group that is a hydrophilic group such as a polyalkylene oxide copolymer of one or more alkylene oxides having from 2 to 6 carbons, especially from 2 to 4 carbons.

It will be appreciated by those of skill in the art that commercially available polysiloxanes for which the structure is unknown or which is outside the scope of this formula may also be suitable for use in the disclosed corrosion inhibitor and fuel cell heat transfer fluid.

For example, in one embodiment, suitable polysiloxanes may be defined by similarities to suitable commercially available polysiloxanes such as the Silwet® siloxane surfactants from GE Silicones/OSi Specialties, and other similar siloxane-polyether copolymers available from Dow Corning or other suppliers. In one exemplary embodiment, suitable siloxane based surfactants will be exemplified by Silwet® L-77, Silwet® L-7657, Silwet® L-7650, Silwet® L-7600, Silwet® L-7200, Silwet® L-7210 and the like.

Suitable organosilane compounds are those silane compounds comprising at least one silicon-carbon bond capable of hydrolyzing in the presence of water to form a silanol, i.e., a compound with one or more Si—OH groups. In one embodiment, suitable organosilane compounds are those of the general formula RSi(OZ)$_3$ wherein the Z groups may be aromatic groups, cycloaliphatic groups, alkyl groups, alkoxy groups, or alkylene groups, and may contain heteroatoms such as N, S, or the like in the form of functional groups such as amino groups, epoxy groups, and the like. In one embodiment, suitable organosilane compounds are of the general formula Z'Si(OZ)$_3$ wherein Z' may be at least one of aromatic groups, cycloaliphatic groups, alkyl groups, alkoxy groups, or alkylene groups, and may contain heteroatoms such as N, S, or the like in the form of functional groups such as amino groups, epoxy groups, and the like, while Z is an alkyl group of from 1 to 5 carbons.

It will again be appreciated by those of skill in the art that commercially available organosilanes for which the structure is unknown or which is outside the scope of this formula may also be suitable for use in the disclosed corrosion inhibitor and fuel cell heat transfer fluid.

For example, in one embodiment, suitable organosilanes may be defined by similarities to suitable commercially available organosilanes such as the Silquest® or Formasil® surfactants from GE Silicones/OSi Specialities, and other suppliers. In one exemplary embodiment, suitable siloxane based surfactants will be exemplified by Formasil 891, Formasil 593, formasil 433, Silquest Y-5560 silane (i.e., polyalkyleneoxidealkoxysilane), Silquest A-186 (2-(3,4-epoxycyclohexyl)ethyltrimethoxysilane), Silquest A-187 (3-glycidoxypropyltrimethoxysilane), or other Silquest silanes available from GE Silicones, Osi Specialties or other suppliers and the like.

Other suitable organosilanes which are believed to be commercially available and are illustrative of suitable siloxane based surfactants include 3-aminopropyltriethoxysilane, N-2-(aminoethyl)-3-aminopropyltrimethoxysilane, octyltriethoxysilane, vinyltriethoxysilane, vinyltrimethoxysilane, methyltriethoxysilane, 3-methacryloxypropyltrimethoxysilane, 3-mercaptopropyltrimethoxysilane, isobutyltrimethoxysilane, phenyltrimethoxysilane, methyltrimethoxysilane, and other such siloxane based surfactants having similar structures but varying numbers of carbons.

In one embodiment, the siloxane based surfactant may be present in the corrosion inhibiting heat transfer fluid in an amount of from 0.01 wt % to about 10 wt %, based on the total weight of the heat transfer fluid, while in one exemplary embodiment; the siloxane based surfactant will be present in the corrosion inhibiting heat transfer fluid in an amount of from 0.02 wt % to about 2 wt %, based on the total weight of the heat transfer fluid.

In addition to or in place of the siloxane based surfactant, the corrosion inhibiting heat transfer fluid may also comprise silica. The term 'silica' as used herein refers to either colloidal silica, silica in nano-form or a combination thereof. The terms 'colloidal silica' and 'silica' are used herein interchangeably. While not wishing to be bound to a particular theory, it is believed that the use of silica of a particular average particle size provides improvements in heat transfer efficiency and/or the heat capacity of a fuel cell heat transfer fluid.

In one embodiment, suitable colloidal silica will have a nominal particle size of from about 1 nm to about 200 nm. In one exemplary embodiment suitable colloidal silica will have an average particle size of from about 1 nm to about 100 nm while in one especially exemplary embodiment, suitable colloidal silica will have an average particle size of from 1 nm to about 40 nm.

Suitable colloidal silica having the appropriate particle size is commercially available under the Ludox® brand from DuPont or Grace Davidson, under the Nyacol® or Bindzil® brands from Akzo Nobel or Eka Chemicals, under the Snowtex® brand from Nissan Chemical. Other suppliers of suitable silica include Nalco and the like.

In one embodiment, the colloidal silica will be used in the corrosion inhibiting heat transfer fluid in an amount of no more than 10,000 ppm, while in one exemplary embodiment; the colloidal silica will be used in an amount of less than 2000 ppm.

It will also be appreciated that the corrosion inhibitor of the corrosion inhibiting heat transfer fluid may also comprise a combination of the siloxane based surfactant and colloidal silica. In one embodiment, the corrosion inhibitor will comprise a combination of the azole compound and the disclosed siloxame compound. In one especially exemplary embodiment, the corrosion inhibitor will consist of the azole and siloxane combination.

In one embodiment, the corrosion inhibiting heat transfer fluid will also comprise one or more non-conductive colorants that are non-ionic or weakly ionic species that are soluble or dispersible in the at least one alcohol or a mixture of alcohols and water at the use concentration of the colorants required to provide coloring of the heat transfer fluid. The term 'non-conductive' as used herein relates to a colorant that produces a conductivity increase of less than about 10 µS/cm when introduced into a standard solution of deionized water, at a maximum concentration of no more than 0.2% by weight, based on the total weight of the standard solution. In one exemplary embodiment, suitable non-conductive colorants will possess good stability in a mixture of alcohol and water under fuel cell operating conditions, i.e., typically temperatures of from about 40° C. to about 100° C.

In one embodiment, the non-conductive colorant is substantially free of functional groups that will form an ionic species due to hydrolysis in an aqueous alcohol or alkylene glycol solution. "Substantially free" as used herein refers to an amount that is not in excess of an amount that will lead to the conductivity of the corrosion inhibiting heat transfer fluid being higher than 10 µS/cm. In another embodiment, the non-conductive colorant is substantially free of functional groups selected from the group consisting of carboxylate groups, sulfonate groups, phosphonate groups, quaternary amines, groups that carry a positive charge, and groups that carry a negative charge. Illustrative examples of groups that carry a positive charge include $Na^+$, $Cu^{2+}$, $—N^+R_3$ (where R may be hydrogen, $C_1$ to $C_{20}$ alkyl groups or aromatic ring containing groups) $Fe^{3+}$, combinations thereof, and the like. Illustrative examples of groups that carry a negative charge include $Cl^-$, $Br^-$, $I^-$, combinations thereof, and the like.

Suitable heat transfer fluid colorants may comprise at least one of the following chromophores: anthraquinone, triphenylmethane, diphenylmethane, azo containing compounds, disazo containing compounds, trisazo containing compounds, diazo containing compounds, xanthene, acridine, indene, phthalocyanine, azaannulene, nitroso, nitro, diarylmethane, triarylmethane, methine, indamine, azine, oxazine, thiazine, quinoline, indigoid, indophenol, lactone, aminoketone, hydroxyketone, stilbene, thiazole, one or more conjugated aromatic groups, one or more conjugated heterocyclic groups (e.g., stilkene, and or bestriazenylamino-stilkene, and/or pyrazoline, and/or coumarine type molecules or mixtures thereof), one or more conjugated carbon-carbon double bonds (e.g., carotene), and combinations thereof. In one exemplary embodiment, the heat transfer fluid colorant will comprise at least one of diarylmethane, triarylmethane, triphenylmethane, diphenylmethane, one or more conjugated aromatic groups, azo, or combinations thereof. In one especially exemplary embodiment, the heat transfer fluid colorant will comprise at least one or more conjugated aromatic groups as a chromophore.

In another embodiment, the non-conductive colorant will contain alkyleneoxy or alkoxy groups and at least one chromophore such as described above. In one embodiment, the chromophore contained in the colorants will be selected from the group consisting of anthraquinone, triphenylmethane, diphenylmethane, azo containing compounds, disazo containing compounds, trisazo containing compounds, diazo containing compounds, one or more conjugated aromatic groups, one or more conjugated heterocyclic groups, and combinations thereof.

Alternatively, suitable non-conductive colorants may be described as those colorants of the formula:

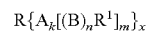

wherein R is an organic chromophore selected from the group consisting of anthraquinone, triphenylmethane, diphenylmethane, azo containing compounds, disazo containing compounds, trisazo containing compounds, diazo containing compounds, xanthene, acridine, indene, thiazole, one or more conjugated aromatic groups, one or more conjugated heterocyclic groups, or combinations thereof; A is a linking moiety in said chromophore and is selected from the group consisting of O, N or S; k is 0 or 1; B is selected from the group consisting of one or more alkyleneoxy or alkoxy groups containing from 1 to 8 carbon atoms; n is an integer of from 1 to 100; m is 1 or 2; x is an integer of from 1 to 5; and $R^1$ is selected from the group consisting of H, $C_1$-$C_6$ alkyl or alkoxy groups containing from 1 to 8 carbon atoms, or combinations thereof.

In one exemplary embodiment, suitable non-conductive colorants are those colorants of the above formula wherein A is N or O; B is selected from the group of one or more alkyleneoxy constituents containing from 2 to 4 carbon atoms, n is from 1 to 30, m is 1 or 2, X is preferably 1 or 2, and $R^1$ is preferably H or a $C_1$-$C_4$ alkyl or alkoxy groups containing from 1 to 6 carbon atoms.

The non-conductive colorants may be prepared by various known methods such as are described in U.S. Pat. No. 4,284,729, U.S. Pat. No. 6,528,564 B1 or other patents issued to Milliken & Company, Spartanburg, S.C., USA.

For example, suitable colorants may be prepared by converting a dyestuff intermediate containing a primary amino group into the corresponding polymeric compound and employing the resulting compound to produce a compound having a chromophoric group in the molecule.

In the case of azo dyestuffs, this may be accomplished by reacting a primary aromatic amine with an appropriate amount of an alkylene oxide or mixtures of alkylene oxides, such as ethylene oxide and the like, according to known procedures, and then coupling the resulting compound with a diazonium salt of an aromatic amine.

In order to prepare liquid colorants of the triarylmethane class, aromatic amines that have been reacted as stated above with an alkylene oxide are condensed with aromatic aldehydes and the resulting condensation products oxidized to form the triarylmethane liquid colorants.

Other suitable colorants may also be prepared by these and other known procedures. Colorants containing contaminating ionic species can be used if purification methods are employed. Illustrative purification and chemical separation techniques include, treatment with ion exchange resins, reverse osmosis, extraction, absorption, distillation, filtration, etc. and similar processes used to remove the ionic species and obtain a purified colorant that is electrically non-conductive.

Commercially available examples of suitable non-conductive colorants for use in the disclosed corrosion inhibiting heat transfer fluids and method include Liquitint® Red ST or other similar polymeric colorants from Milliken Chemical of Spartanburg, S.C., USA, or colorants from Chromatech of Canton, Mich., USA. Illustrative examples include the following: Liquitint Red ST, Liquitint Blue RE, Liquitint Red XC, Liquitint Patent Blue, Liquitint Bright yellow, Liquitint Bright orange, Liquitint Royal Blue, Liquitint Blue N-6, Liquitint Bright Blue, Liquitint Supra Blue, Liquitint Blue HP, Liquitint Blue DB, Liquitint Blue II, Liquitint Exp. Yellow 8614-6, Liquitint Yellow BL, Liquitint Yellow II, Liquitint Sunbeam Yellow, Liquitint Supra yellow, Liquitint Green HMC, Liquitint violet, Liquitint Red BL, Liquitint Red RL, Liquitint Cherry Red, Liquitint Red II, Liquitint Teal, Liquitint Yellow LP, Liquitint Violet LS, Liquitint Crimson, Liquitint Aquamarine, Liquitint Green HMC, Liquitint Red HN, Liquitint Red ST, and combinations thereof.

In one exemplary embodiment, the non-conductive colorant will be at least one of Liquitint® Red ST from Milliken, Liquitint® Red XC from Chromatech, Chromatint® Yellow 1382 from Chromatech or Liquitint® Blue® RE from Chromatech, while in an especially exemplary embodiment, the non-conductive colorant will be Liquitint® Blue RE from Chromatech.

In one embodiment, the non-conductive colorant will be present in the fuel cell heat transfer fluid in an amount of from 0 to 0.2% by weight, based on the total amount of the corrosion inhibiting heat transfer fluid. In another embodiment, the non-conductive colorant will be present in the heat transfer fluid in an amount of from 0.0001-0.1% by weight, based on the total amount of the heat transfer fluid, while in one exemplary embodiment; the non-conductive colorant will be used in an amount of from 0.0002 to 0.05% by weight, based on the total amount of the heat transfer fluid.

Illustrative examples of suitable alcohols for use in the disclosed heat transfer fluids are methanol, ethanol, propanol, butanol, furfurol, ethylene glycol, diethylene glycol, triethylene glycol, 1,2-propylene glycol, 1,3-propylene glycol, dipropylene glycol, butylene glycol, glycerol, monoethylether of glycerol, dimethyl ether of glycerol, 1,2,6-hexanetriol, trimethylolpropane, methoxyethanol, or a combination comprising one or more of such alcohols. Illustrative examples of particularly suitable alcohols include ethylene glycol, propylene glycol, butyl glycol, glycerol, diethylene glycol, and the like, as well as mixtures thereof. In one embodiment, the alcohol will be ethylene glycol or 1,2-propylene glycol or 1,3-propylene glycol, while in one exemplary embodiment; the disclosed corrosion inhibiting heat transfer fluid will comprise ethylene glycol.

In one embodiment, the alcohol will be present in the heat transfer fluid in an amount of from 10-99.9% by weight, based on the total amount of the corrosion inhibiting heat transfer fluid. In another embodiment, the at least one alcohol will be present in the heat transfer fluid in an amount of from 20-99.9% by weight, based on the total amount of the heat transfer fluid, while in one exemplary embodiment, the at least one alcohol will be used in an amount of from 20 to 99.9% by weight, based on the total amount of the corrosion inhibiting heat transfer fluid.

As previously indicated, water may be present in the disclosed corrosion inhibiting fuel cell heat transfer fluids. In one exemplary embodiment, deionized water will be used. In one embodiment, water will be present in the corrosion inhibiting heat transfer fluid in an amount of from 0-90% by weight, based on the total amount of the heat transfer fluid. In another embodiment, water may be present in the heat transfer fluid in an amount of from 0.1-80% by weight, based on the total amount of the heat transfer fluid, while in one exemplary embodiment; water will be used in an amount of from 0.1 to 70% by weight, based on the total amount of the corrosion inhibiting heat transfer fluid.

For example, water may not be present in the concentrate version of a heat transfer fluid at all, i.e., 0 wt % but may be present in some concentrates in amounts up to about 50 wt %. With regards to diluted heat transfer fluids, water may be present in amounts of from 20 wt % up to 90% wt.

Optional corrosion inhibitors in addition to the required corrosion inhibitor may also be used. Such optional corrosion inhibitors include aluminum and aluminum based alloy corrosion inhibitors, copper and copper based corrosion inhibitors, amines such as ethanolamine, diethanolamine, triethanolamine, octylamine and morpholine, orthosilicate esters as described in US2004/0028971A1 and the like. It will be appreciated that such optional corrosion inhibitors may only be used in addition to the disclosed required corrosion inhibitors and may not be used in place thereof. In one exemplary embodiment, the optional corrosion inhibitor will be one or more tetraalkylorthosilicate esters having alkyl groups of from 1 to 20 carbon atoms. Illustrative examples include tetramethylorthosilicate, tetraethylorthosilicate, and the like. Such tetraalkylorthosilicate esters may used in one exemplary embodiment in an amount of from 0 wt % to 5 wt %, based on the total weight of the fuel cell heat transfer fluid.

The disclosed corrosion inhibiting heat transfer fluids may also comprise additional additives such as colorants, wetting agents, antifoam agents, biocides, defoamers, bitterants, non-ionic dispersants or combinations thereof in amounts of up to 10% by weight, based on the total amount of the corrosion inhibiting heat transfer fluid.

In one embodiment, the disclosed corrosion inhibiting heat transfer fluids will comprise from 20-99.9% by weight of at least one alcohol or an alcohol mixture, from 0.1-90% by weigh of water, from ppm to 5000 ppm of an azole compound and at least one of either a siloxane based surfactant in an amount of from 0.01 wt % to 10 wt % or colloidal silica in an amount of no more than 10,000 ppm, based on the total amount of the heat transfer fluid, and 0.0 to 10% by weight of other optional heat transfer fluid additives. In one exemplary embodiment, the disclosed heat transfer fluids will comprise from 20-99.9% by weight of at least one alcohol or an alcohol mixture, from 0.1-90% by weigh of water, from 10 ppm to 500 ppm of an azole compound and at least one of either a siloxane based surfactant in an amount of from 0.02 wt % to 2 wt % or colloidal silica in an amount of less than 2000 ppm, and 0.0 to 10% by weight of other heat transfer fluid additives based on the total amount of the heat transfer fluid.

The disclosed corrosion inhibiting heat transfer fluids may be prepared by mixing the components together. Normally, the alcohol and water are preferably mixed together first. The other components and additives are then added to the alcohol-water mixture by mixing and adequate stirring.

It will be appreciated that the disclosed heat transfer fluids may be used in a variety of assemblies comprising one or more alternative power sources. The term 'alternative power source' as used here refers to power source technologies that provide improvements in energy efficiency, environmental concerns, waste production and management issues, natural resource management, and the like. Examples of alternative power sources that have been developed include, but are not limited to, batteries, fuel cells, solar cells or solar panels, photovoltaic cells, and internal combustion engines powered by the condensation of steam, natural gas, diesel, hydrogen, and/or the like. In one embodiment, the term 'alternative power source' includes devices powered by internal combustion engines operating with a clean heat transfer system, i.e., a heat transfer system that does not contribute to the concentration of ionic species in the heat transfer fluid. Such alternative power sources may lie used alone or in combinations thereof, such as those employed in hybrid vehicles.

It will be appreciated that assemblies comprising such alternative power sources include any article traditionally powered by an internal combustion engine, such as automotive vehicles, boats, generators, lights, aircrafts and airplanes, trains or locomotives, military transport vehicles, stationary engines, and the like. The assemblies also include additional systems or devices required for the proper utilization of alternative power sources, such as electric motors, DC/DC converters, DC/AC inverters, electric generators, and other power electronic devices, and the like. The assemblies may also include systems or devices required for the proper utilization of the alternative power sources such as electric motors, DC/CC converters, DC/AC inverters, electric generators, and other power electronics and electrical devices, and the like.

Particularly suitable applications are those having heat transfer systems that require heat transfer fluids having low conductivity. Illustrative examples include glass and metal manufacturing processes where a high electrical voltage/current is applied to the electrodes used to keep a material such as glass or steel in a molten state. Such processes typically require a heat transfer fluid having low conductivity to cool the electrodes.

The disclosed assemblies will generally comprise an alternative power source and a heat transfer system in thermal communication with the alternative power source. In one embodiment, the heat transfer system will comprise a circulation loop defining a flow path for a corrosion inhibiting liquid heat transfer fluid having a conductivity of less than 200 $\mu$S/cm. In one exemplary embodiment, the heat transfer system will comprise a circulation loop defining a flow path for a corrosion inhibiting liquid heat transfer fluid having a conductivity of less than 200 $\mu$S/cm and comprising a corrosion inhibitor comprising an azole compound, and at least one of a siloxane based surfactant, colloidal silica, or mixtures thereof.

As illustrative example of the disclosed assembly may be seen in FIG. 1. The major components of the cooling system, and the main system components 16 that may require the use of coolant or heat transfer fluid as cooling media are shown in the FIGURE. As indicated therein, the assembly may contain internal combustion engine 5, or fuel cells 5 or solar cells 5 as the vehicle primary power source 7. It also contains a rechargeable secondary battery 12 or an optional ultra-capacitor 13 that may be charged via the vehicle regenerative braking system. In this embodiment, the battery 12 and/or the ultra-capacitor 13 may act as secondary power sources. The assembly may also contain power electronic devices, such as DC/DC converters 10, DC/AC inverters 10, generators 8, power splitting devices 9, and/or voltage boost converters 11, etc. In addition, the assembly may also contain fuel cell or solar cell "balance of plant" subsystems 6. These may be air compressors, pumps, power regulators, etc. The assembly also contain HVAC systems 14, e.g., air-conditioning system for the climate control of vehicle interior space. These are included in the vehicle system 16 in the illustrated assembly of FIG. 1 that may require the use of coolant or heat transfer fluid for temperature control. Similar to other vehicle cooling systems, the assembly in the illustrate example also contain a coolant recirculation pump 1, coolant flow path 4, coolant tank 2, and a radiator or heat exchanger 3, and a fan 15. The fan may be substituted by an external cooling source, e.g., a different (or isolated) cooling system with its own cooling media.

In one embodiment, the alternative power source will be a fuel cell. It will be appreciated that a fuel cell is in thermal communication with the disclosed heat transfer systems and fluids, the electrical conductivity of the disclosed heat transfer fluids will be, in one embodiment, no more than 10 $\mu$S/cm. In an especially exemplary embodiment comprising a fuel cell, the disclosed heat transfer fluids will have an electrical conductivity of from 0.02 to no more than 10 $\mu$S/cm. In one especially exemplary embodiment, the disclosed corrosion inhibiting heat transfer fluids will have an electrical conductivity of from 0.05 to no more than 5 $\mu$S/cm.

The disclosed corrosion inhibiting heat transfer fluids may be used in a number of different types of fuel cells comprising an electrode assembly comprising an anode, a cathode, and an electrolyte, and a heat transfer fluid in thermal communication with the electrode assembly or fuel cell. In one embodiment the heat transfer fluid may be contained or flow in channel or flow path defined by a circulation loop or heat transfer fluid flow channel in thermal communication with said fuel cell.

Illustrative types of suitable fuel cells include PEM (Proton Exchange Membrane or Polymer Electrolyte Membrane) fuel cells, AFC (alkaline fuel cell), PAFC (phosphoric acid fuel cell), MCFC (molten carbonate fuel cell), SOFC (solid oxide fuel cell), and the like. In one exemplary embodiment, the disclosed corrosion inhibiting heat transfer fluids will be used in PEM and AFC fuel cells.

The singular forms "a", "an" and "the" include plural referents unless the context clearly dictates otherwise. "Optional" or "optionally" means that the subsequently described event or circumstance may or may not occur, and that the description includes instances where the event occurs and instances where it does not. The modifier "about" used in connection with a quantity is inclusive of the stated value and has the meaning dictated by the context (e.g., includes the degree of error associated with measurement of the particular quantity).

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments falling within the scope of the appended claims.

Example 1

The galvanostatic pitting potential test (Modified ASTM D6208 test method) for determining the repassivation potential of aluminum alloy 3003 under galvanostatic polarization was used to evaluate the corrosion protection effectiveness of a fuel cell heat transfer fluid comprising various corrosion inhibitors. Six test solutions were evaluated, each solution comprising the base solution and one of the inhibitors identified in column 2 of Table 1. The test method is designed to measure the relative effectiveness of inhibitors to mitigate pitting corrosion of aluminum and its alloys rapidly and reproducibly. The pitting protection potential (or repassivation potential) obtained from the test is a measure of the protection against continued pitting corrosion by the corrosion inhibitor tested. A more positive pitting potential is an indication that the inhibitor is more effective in providing protection for aluminum 3003 against pitting corrosion under the test conditions. Test conditions included aluminum 3003 as the electrode, room temperature, and an anodic current density of 100 $\mu A/cm^2$.

TABLE 1

| Base Solution | Inhibitor (ppm) | Pitting Protection Potential (V/AgAgCl) |
|---|---|---|
| 50% Ethylene Glycol + 50 ppm Cl⁻ | Blank | −0.4925 |
| | 5000 Ludox ® TMA | −0.4508 |
| | Silwet ® L-7650 | −0.4502 |
| | 500 Nyacol ® 215 | −0.4484 |
| 50% Ethylene Glycol + 100 ppm Cl⁻ | Blank | −0.4966 |
| | 1000 Nyacol ® 215 | −0.4838 |

The results given in Table 1 show that two colloidal silica products, i.e., Ludox® TMA (a natural pH colloidal silica with a nominal particle size 22 nm) and Nyacol® 215 (a colloidal silica with a nominal particle size of 4 nm) are effective aluminum corrosion inhibitors. A siloxane polyether copolymer, Silwet® L-7650 (MW=3000 Daltons, All EO, pendant type siloxane polyether copolymer) is also an effective aluminum corrosion inhibitor. Under the test conditions, colloidal silica Nyacol® 215 is the most effective Al corrosion inhibitor.

Example 2

The corrosion inhibiting action of the disclosed corrosion inhibiting heat transfer fluids was evaluated using the Modified ASTM D1384 Test. A base solution of 52% wt Glycol+ 48% DI water was used. Five test samples and blank were prepared according to column 1 of Table 2. Test conditions included a temperature of 88 C, while the test duration was 336 hours. One cast Al coupon and one brass coupon were used to determine the degree of corrosion caused by contact with the various test solutions. Note: Negative mass loss values indicated that the coupon sample had weight gain at the end of the test. BZT is benzodiazole.

TABLE 2

| Inhibitor | Al Mass loss (mg) | Brass Mass loss (mg) | Al Coupon appearance | Al Protection Rating | Solution Conductivity ($\mu$S/cm) |
|---|---|---|---|---|---|
| Blank | −2.1 | 47.1 | Localized attack on 16% of the surface | 3 = worst | 0.35 |
| 40 ppm BZT | −3.8 | 1.0 | 70% of surface stained | 5 | 0.38 |
| 0.1% wt Silwet L-77 | −2.6 | 33.9 | 25% surface stained, a few localized attack sites | 5 | 0.34 |
| 0.1% wt Silwet L-77 + 40 ppm BZT | −3.7 | 0.9 | No apparent corrosion attack, shiny surface | 10 = Best | 0.38 |
| 0.1% wt Silwet L-7650 | −3.3 | 73.1 | Localized attack on 12% of the surface | 4 | 0.38 |
| 0.1% wt Silwet L-7650 + 40 ppm BZT | −3.9 | 0.3 | 5% surface staining, a small localized attack site | 7 | 0.36 |

The test results shown in Table 2 indicate the following: (1) The two Silwet® siloxane polyether copolymer surfactants (L-77 and L-7650) are not conductive. The conductivity of the solution shows essentially no charge after addition of 0.1% wt of the surfactant to the base glycol heat transfer fluid, (2)

Addition of 40 ppm BZT (benzotriazole) into the base heat transfer fluid solution also did not cause any significant change in the solution conductivity. The increase is no more than 0.030 μS/cm. (3) Aluminum general corrosion rates were all well within the acceptable limits of the ASTM D1384 specification, i.e., <30 mg weight loss. Mass measurements indicate that the cast aluminum coupons show that all the inhibitor combinations tested show improvement in Al localized corrosion protection in comparison with the blank solution (i.e., with the base glycol-water heat transfer fluid solution). The best result was obtained with the disclosed corrosion inhibiting fuel cell heat transfer fluid containing 0.1% wt Silwet L-77+40 ppm BZT. 0.1% wt Silwet L-7650+40 ppm BZT produced the second best result. The results illustrate that the disclosed corrosion inhibitor containing both a siloxane based surfactant with an azole has a synergistic positive effect on preventing aluminum localized corrosion in a heat transfer fluid solution. (4) In solutions without the presence of BZT, brass corrosion rates were all higher than the acceptable limit, i.e., specification for acceptable mass loss is <10 mg.

Example 3

The corrosion inhibiting action of the disclosed corrosion inhibiting heat transfer fluids was again evaluated using the Modified ASTM D1384 Test. A base solution of 50% vol Ethylene glycol+50% vol DI Water was used. Two test samples and blank were prepared according to column 1 of Table 3. Test conditions included a temperature of 80 C, while the test duration was 336 hours. One cast Al coupon and one brass coupon were used to determine the degree of corrosion caused by contact with the various test solutions. Table 3 shows coupon mass loss data.

TABLE 3

| Inhibitor (ppm) | Cast Al (mg) | Al 3003 (mg) | Brass (mg) | Stainless Steel (mg) | Conductivity (μS/cm) |
|---|---|---|---|---|---|
| Blank | −3.4 | −0.7 | 20.4 | 0.0 | 0.16 |
| 200 Ludox SK | 2.4 | 0.2 | 12.9 | 0.1 | 0.26 |
| 400 Ludox SK | 3.6 | 0.4 | 8.7 | 0.1 | 0.38 |

The results shown in Table 3 indicate the following: (1) Ludox SK, a natural pH colloidal silica product with a nominal particle size of 12 nanometer, can provide acceptable corrosion protection under the test condition. Particularly, corrosion protection of the brass improves with increasing Ludox SK concentration. 400 ppm Ludox SK alone is sufficient to provide satisfactory corrosion protection for cast aluminum, Al 3003, brass and stainless steel under the test conditions per ASTM D1384 coupon mass loss specifications. (2) Ludox SK at 200 to 400 ppm dosage levels leads to minimal increase in solution conductivity.

Example 4

The ability of the disclosed siloxane based surfactants in reducing surface tension of a 52% wt glycol+48% water solution was determined. Several other known effective surface tension reduction agents were also tested. The surface tension was measured using the Kruss K12 Tensiometer, SN# 96415, using the plate method. The surface tension of DI water was measured to be 72.45 to test the accuracy of the device (0.5% error compared to accepted value). The results are shown in Table 4. Similar surface tension measurements were also conducted in a 50 wt % ethylene glycol+50 wt % deionized water solution with several disclosed siloxane based surfactants under different surfactant concentration conditions. The results are shown in Table 5.

TABLE 4

| Additive | Concentration of Additive (%) | Surface Tension (mN/m) |
|---|---|---|
| None | 0 | 50.37 |
| Silwet L-77 | 10 | 21.35 |
| Silwet L-7657 | 10 | 23.82 |
| Silwet L-7600 | 10 | 23.71 |
| Dehypound HSC 5515 | 10 | 29.82 |
| Silwet L-7650 | 10 | 24.46 |
| Dow Corning Superwetting agent Q2-5211 | 10 | 21.44 |

TABLE 5

Example 4 - Additional Surface Tension Measurement Results
Surface Tension Measurement Results
Base Solution: 50 wt % EG + 50 wt % DI H2O

| | Additives | | | |
|---|---|---|---|---|
| Concentration (mg/L) | Silwet L-7650 Ave. Surface Tension (mN/M) | Silwet L-7657 Ave. Surface Tension (mN/m) | Silwet L-77 Ave. Surface Tension mN/m) | Dow-Corning Q2-5211 Ave. Surface Tension (mN/m) |
| 0 | 51.2 | 48.82 | 53.7 | 55.52 |
| 45.5 | 41.49 | 30.4 | 28.81 | 30.32 |
| 115.4 | 34.48 | 28.74 | 25.84 | 25.99 |
| 166.7 | 33.21 | 28.24 | 24.29 | 24.66 |

TABLE 5-continued

Example 4 - Additional Surface Tension Measurement Results
Surface Tension Measurement Results
Base Solution: 50 wt % EG + 50 wt % DI H2O

| Concentration (mg/L) | Additives | | | |
|---|---|---|---|---|
| | Silwet L-7650 Ave. Surface Tension (mN/M) | Silwet L-7657 Ave. Surface Tension (mN/m) | Silwet L-77 Ave. Surface Tension mN/m) | Dow-Corning Q2-5211 Ave. Surface Tension (mN/m) |
| 205.9 | 32.41 | 27.94 | 23.45 | 24.03 |
| 250 | 32.37 | 27.62 | 22.86 | 23.39 |

Note: Superwetting agent Q2-5211 is a low molecular weight non-ionic silicone polyether surfactant available from Dow Corning of Midland, Mich. Dehypound HSC 5515 is a surfactant blend based on alkyl polyglycoside and nonionic defoaming agent available from Cognis Corp. of Cincinnati, Ohio.

As shown in Tables 4 and 5, the disclosed siloxane based surfactants are all very effective in reducing the surface tension of the glycol based heat transfer fluid. Among the tested compounds, Silwet L-77 is most effective in reducing the surface tension of the solution.

The invention claimed is:

1. A heat transfer system, comprising a circulation loop defining a flow path for a corrosion inhibiting liquid heat transfer fluid having a conductivity of less than 10 μS/cm and comprising
   a corrosion inhibitor comprising
      an azole compound, and
      at least one of a siloxane based surfactant, colloidal silica, or mixtures thereof;
   wherein the siloxane based surfactant comprises a polysiloxane of the general formula $R_3$—Si—$[O$—$Si(R)_2]_x$—$OSiR_3$ wherein R is an alkyl group or polyalkylene oxide copolymer of from 1 to 200 carbons and x is from 0 to 100, and the polysiloxane has at least one R group that is a polyalkylene oxide copolymer of one or more alkylene oxides having from 2 to 6 carbons.

2. The heat transfer system of claim 1, wherein the corrosion inhibitor comprises the azole compound and at least one of the siloxane based surfactant or a mixture of the siloxane based surfactant and colloidal silica.

3. The heat transfer system of claim 1 wherein the azole compound is present in an amount of from 1 ppm to 5000 ppm, based on the total weight of the corrosion inhibiting heat transfer fluid.

4. The heat transfer system of claim 1 wherein the siloxane based surfactant is present in an amount of from 0.01 wt % to 10 wt %, based on the total weight of the corrosion inhibiting heat transfer fluid.

5. The heat transfer system of claim 1 wherein the colloidal silica is present in an amount of no more than 10,000 ppm, based on the total weight of the corrosion inhibiting heat transfer fluid.

6. The heat transfer system of claim 1 wherein the azole compound is of the formula (I), (II), (III), or (IV):

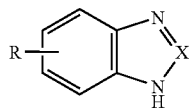 (I)

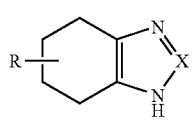 (II)

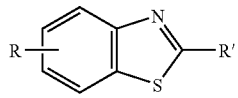 (III)

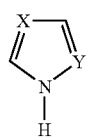 (IV)

wherein R is hydrogen or halogen such as Cl or Br, or a C1 to C20 alkyl group; R' is at least one of hydrogen, C1 to C20 alkyl group, or SH or SR group; and X is N, C—SH or CH; and Y is selected from N, C—R or CH group, and R is defined as above.

7. The heat transfer system of claim 6 wherein the azole compound is of formula (I) wherein X is N.

8. The heat transfer system of claim 7 wherein the azole compound is of formula (I) wherein X is N and R is hydrogen or an alkyl group of from 1 to less than 10 carbons.

9. The heat transfer system of claim 6 wherein the azole compound is at least one of benzotriazole, tolytriazole, 4-methyl benzotriazole, 5-methyl benzotriazole, butyl benzotriazole, mercaptobenzothiazole, benzimidazole, methyl benzimidazole, chloro- or bromo-methylbenzotriazoles or combinations thereof.

10. The heat transfer system of claim 9 further comprising water.

11. The heat transfer system of claim 1 wherein the corrosion inhibitor further comprises an organosilane compound of the general formula $RSi(OZ)_3$ wherein the R groups may be the same or different and may be aromatic groups, cycloaliphatic groups, alkyl groups, alkoxy groups, or alkylene groups.

12. The heat transfer system of claim 11 wherein one or more of the R groups contain heteroatoms such as N or S.

13. The heat transfer system of claim 11 wherein the organosilane compound is at least one of 2-(3,4-epoxycyclohexyl)

ethyltrimethoxysilane, 3-glycidoxypropyltrimethoxysilane, 3-aminopropyltriethoxysilane, N-2-(aminoethyl)-3-aminopropyltrimethoxysilane, octyltriethoxysilane, vinyltriethoxysilane, vinyltrimethoxysilane, methyltriethoxysilane, 3-methacryloxypropyltrimethoxysilane, 3-mercaptopropyltrimethoxysilane, isobutyltrimethoxysilane, phenyltrimethoxysilane, methyltrimethoxysilane, or combinations thereof.

14. The heat transfer system of claim 1 wherein the colloidal silica has an average particle size of from 1 nm to 200 nm.

15. The heat transfer system of claim 1 further comprising an alcohol that is at least one of methanol, ethanol, propanol, butanol, furfurol, ethylene glycol, diethylene glycol, triethylene glycol, 1,2-propylene glycol, 1,3-propylene glycol, dipropylene glycol, butylene glycol, glycrol, monoethylether of glycerol, dimethyl ether of glycerol, 1,2,6-hexanetriol, trimethylolpropane, methoxyethanol, or a combination thereof.

16. An assembly powered by an alternative power source comprising
  an alternative power source and
  a heat transfer system in thermal communication with the alternative power source, the heat transfer system comprising
    a circulation loop defining a liquid flow path, and
    a corrosion inhibiting heat transfer fluid in thermal communication with the alternative power source, the corrosion inhibiting heat transfer fluid having a conductivity of less than 10 μS/cm and comprising
      a corrosion inhibitor comprising
        an azole compound, and
        at least one of a siloxane based surfactant, colloidal silica, or mixtures thereof;
    wherein the siloxane based surfactant comprises
      a polysiloxane of the general formula $R_3$—Si—[O—Si$(R)_2]_x$—OSi$R_3$ wherein R is an alkyl group or polyalkylene oxide copolymer of from 1 to 200 carbons and x is from 0 to 100, and the polysiloxane has at least one R group that is a polyalkylene oxide copolymer of one or more alkylene oxides having from 2 to 6 carbons.

17. The assembly of claim 16 wherein the alternative power source comprises a fuel cell comprising
  an electrode assembly comprising
    an anode,
    a cathode, and
    an electrolyte.

* * * * *